(12) United States Patent
Zhu et al.

(10) Patent No.: US 8,070,520 B2
(45) Date of Patent: Dec. 6, 2011

(54) ELECTRICAL CARD CONNECTOR

(75) Inventors: Fang-Yue Zhu, Kunshan (CN); Yun-Song Sun, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 34 days.

(21) Appl. No.: 12/688,925

(22) Filed: Jan. 18, 2010

(65) Prior Publication Data

US 2010/0279552 A1 Nov. 4, 2010

(30) Foreign Application Priority Data

Apr. 29, 2009 (CN) .......................... 2009 2 0302700

(51) Int. Cl.
*H01R 24/00* (2006.01)
(52) U.S. Cl. ...................................................... 439/630
(58) Field of Classification Search .................. 439/630, 439/159, 326
See application file for complete search history.

(56) References Cited

U.S. PATENT DOCUMENTS

| | | | |
|---|---|---|---|
| 6,102,744 A * | 8/2000 | Korsunsky et al. ........... | 439/637 |
| 7,004,770 B2 | 2/2006 | Wu | |
| 7,044,797 B1 * | 5/2006 | Lai ................................. | 439/630 |
| 7,070,453 B1 * | 7/2006 | Chen ............................. | 439/630 |
| 7,114,993 B2 * | 10/2006 | Chen ............................. | 439/630 |
| 2006/0046572 A1 * | 3/2006 | Su et al. ........................ | 439/630 |

* cited by examiner

*Primary Examiner* — Alexander Gilman

(74) *Attorney, Agent, or Firm* — Wei Te Chung; Andrew C. Cheng; Ming Chieh Chang

(57) ABSTRACT

An electrical card connector (100) includes an insulative housing (1), a set of first contacts (21), and a metal shell (4) covering the insulative housing. The insulative housing has a receiving space (15) for receiving a first card and a bottom wall (11) under the receiving space. The bottom wall has a set of slots (111) extending along the first card insertion direction. The slots include a special slot (110) having a protrusion (1101) extending thereinto. The contacts have first retaining portions (214) retained in the insulative housing, first contacting portions (212) received in the slots (111) and bending upwardly into the receiving space (15) for mating with the first card, and first tail portions (215) extending from the first retaining portions for being mounted to a PCB. The first contacts include a special contact (210) having a connecting portion (216) extending along the special slot (110) and located between the first contacting portion (212) and the first retaining portion (214). The connecting portion (216) is sustained upwardly by the protrusion (1101).

18 Claims, 5 Drawing Sheets

ELECTRICAL CARD CONNECTOR

BACKGROUND OF THE INVENTION

1. Field of the Invention

The present invention relates to an electrical card connector, and more particularly to an electrical card connector having an extra elastic contacting portion for mating with a card.

2. Description of Related Art

Electrical card connectors present as a medium being widely used in computers and other electronic devices for electrically mating with electrical cards. A conventional electrical card connector usually includes an insulative housing, a set of contacts retained in the insulative housing for mating with the card, and a metal shell covering the insulative housing. The insulative housing has a receiving space for receiving the card, and a bottom wall under the receiving space and having a set of slots extending along the card insertion direction. The contact has a retaining portion retained in the insulative housing, a tail portion extending from the retaining portion for being mounted to a PCB, a contacting portion bending upwardly into the receiving space for mating with the card, and a connecting portion extending along the slot and located between the contacting portion and the retaining portion.

The connecting portion extends cantileveredly along the slot and has a rear end supported by the bottom wall and a front end connecting to the contacting portion. Therefore, the connecting portion may be deformed easily by the card or other components, and the contacting portion has a weak elastic force to mate with the card.

Hence, an improved electrical card connector over the prior art is required to overcome the problems thereof.

BRIEF SUMMARY OF THE INVENTION

According to one aspect of the present invention, an electrical card connector comprises an insulative housing, a plurality of first contacts, and a metal shell covering the insulative housing. The insulative housing has a receiving space for receiving a first card and a bottom wall under the receiving space. The bottom wall has a plurality of slots extending along the first card insertion direction. The slots include a special slot having a protrusion extending thereinto. The contacts have first retaining portions retained in the insulative housing, first contacting portions received in the slots and bending upwardly into the receiving space for mating with the first card, and first tail portions extending from the first retaining portions for being mounted to a PCB. The first contacts include a special contact having a connecting portion extending along the special slot and located between the first contacting portion and the first retaining portion. The connecting portion is sustained upwardly by the protrusion.

According to another aspect of the present invention, an electrical card connector comprises an insulative housing, a plurality of first contacts, and a metal shell covering the insulative housing. The insulative housing has a bottom wall, a rear wall extending upwardly from a rear end of the bottom wall and a receiving space formed therebetween for receiving a first card. The bottom wall has a plurality of slots extending along the first card insertion direction. The slots include a special slot having a protrusion extending thereinto. The first contacts include a special contact having a length longer than that of the other first contacts along the first card insertion direction. The special contact has a first retaining portion retained in the rear wall, a first contacting portion received in the special slot and bending upwardly into the receiving space for mating with the first card, a first tail portion extending from the first retaining portions for being mounted to a PCB, and a connecting portion connecting the first contacting portion and located between the first contacting portion and the first retaining portion. The connecting portion extends along the special slot and is sustained upwardly by the protrusion.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is an exploded view of the electrical card connector shown in

FIG. 1; and

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 3:
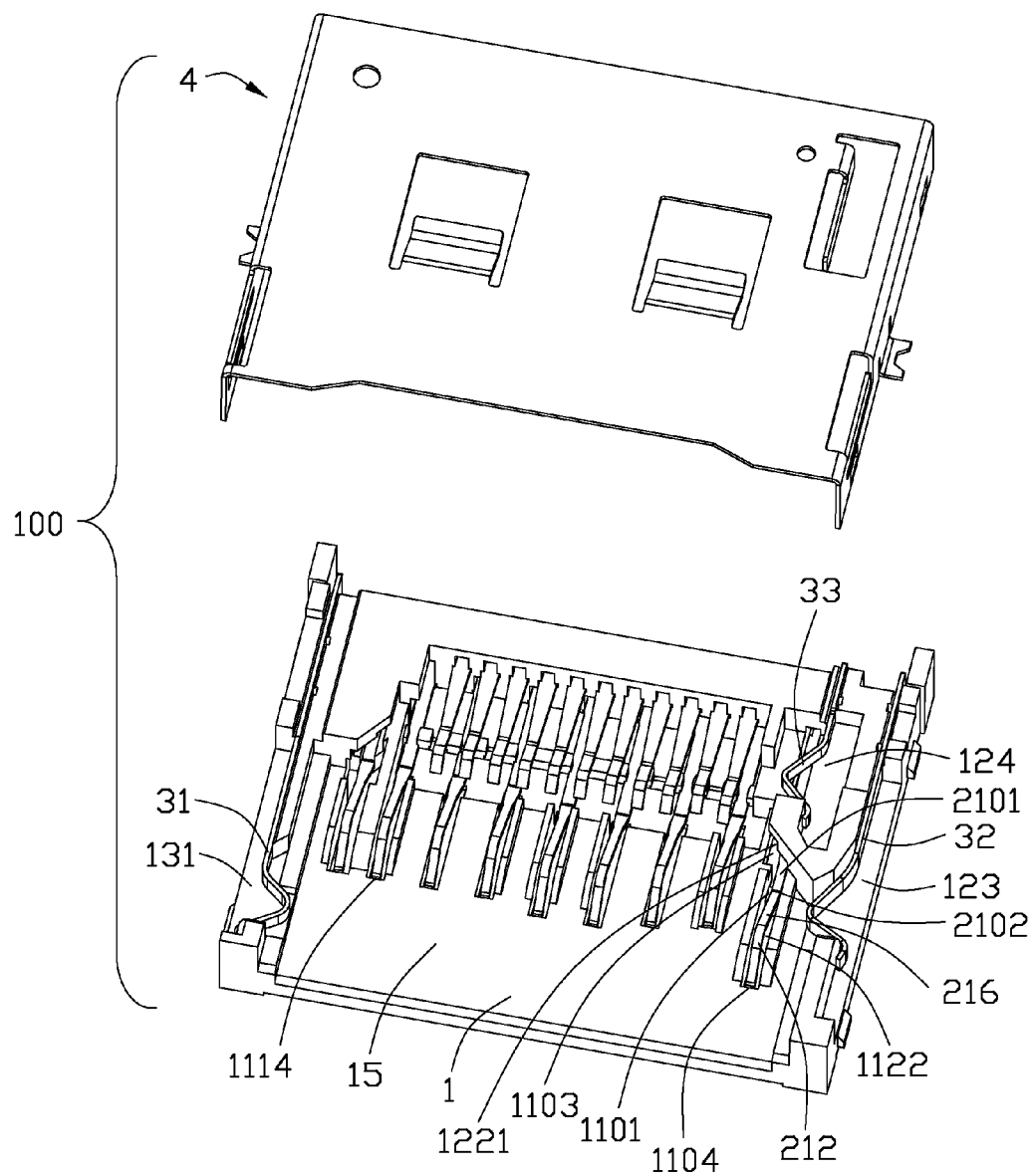
FIG. 3 is a partly exploded view of the electrical card connector shown in FIG. 1.
Figure 4:
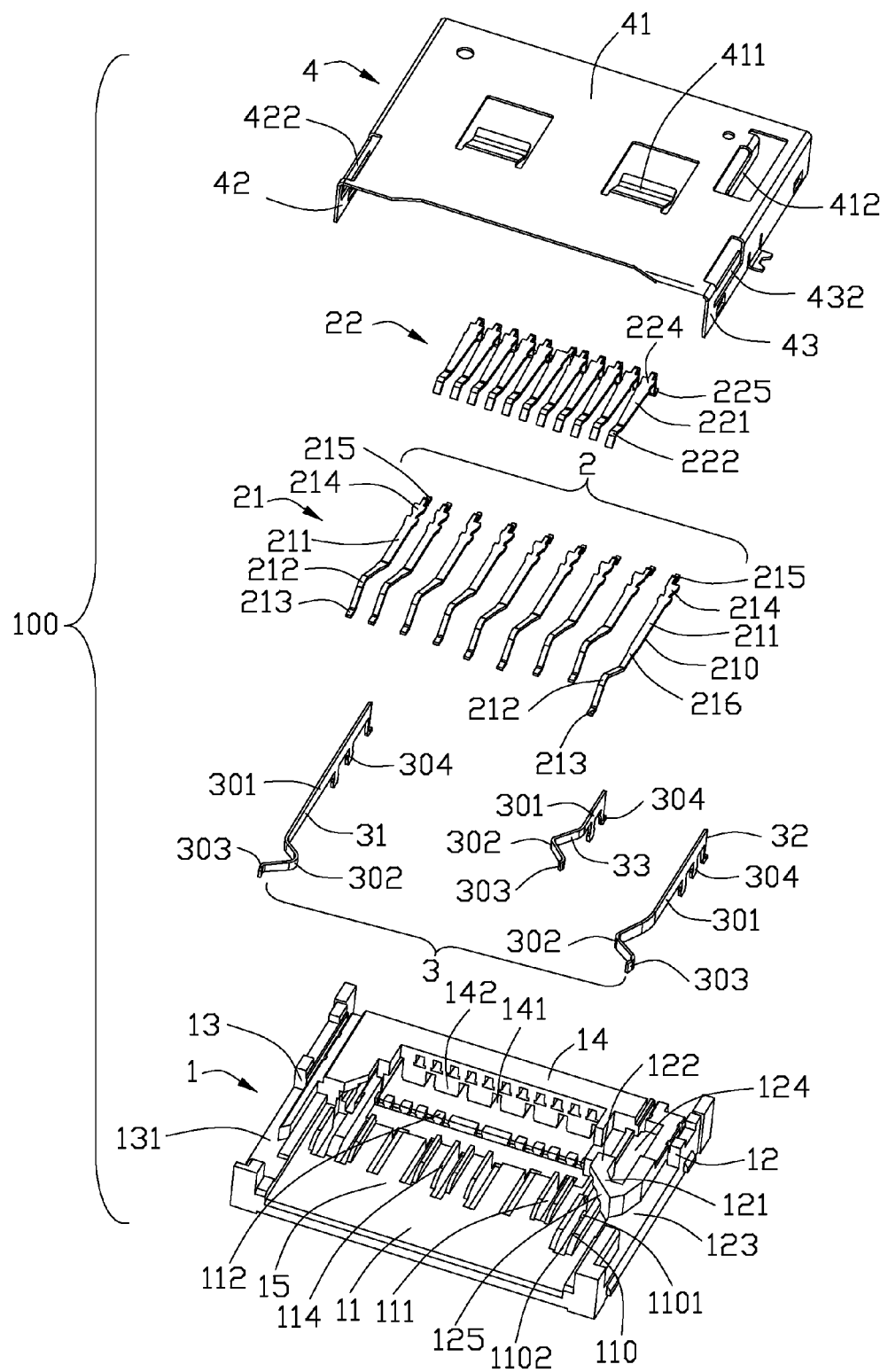

Referring to FIGS. 3 and 4, an electrical card connector 100 according to an embodiment of the present invention is disclosed. The electrical card connector 100 has an interface 101 for insertion of a first card (here is SD card, not shown) and a second card (here is mini SD card, not shown) having a narrower width than the first card. The electrical card connector 100 includes an insulative housing 1, a plurality of contacts 2 and a plurality of detecting terminals 3 retained in the insulative housing 1, and a metal shell 4 covering the insulative housing 1.

Figure 1:
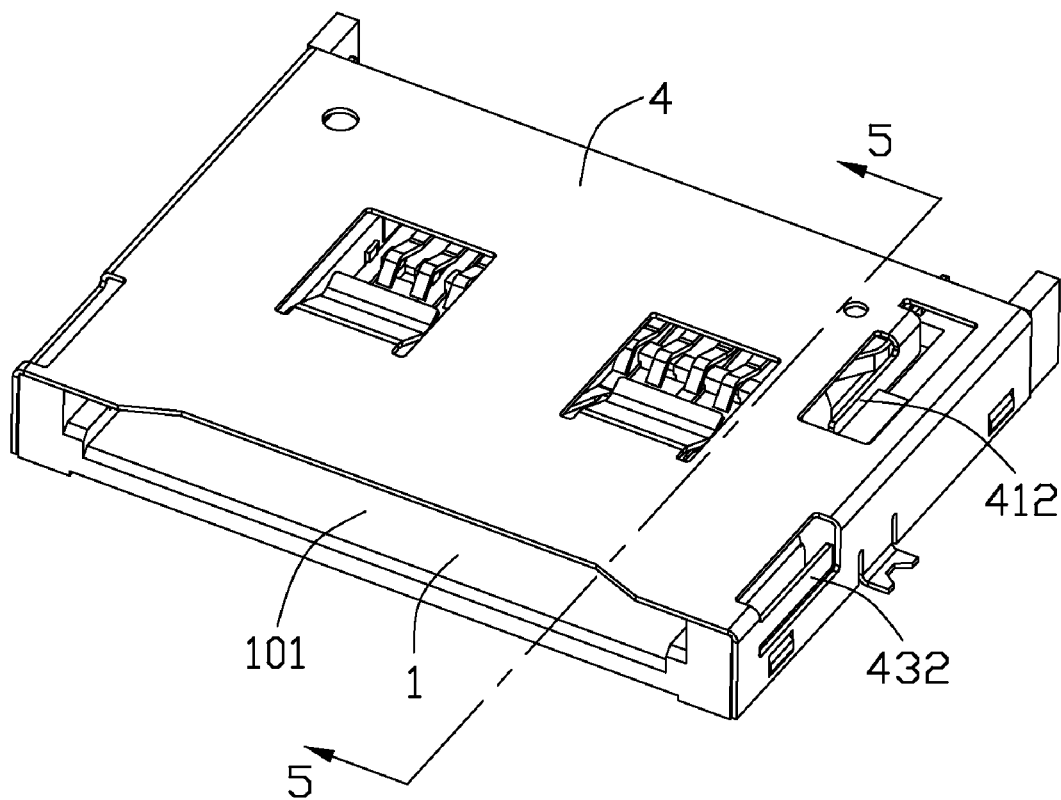
FIG. 1 is a perspective view of an electrical card connector according to the present invention.
Figure 2:
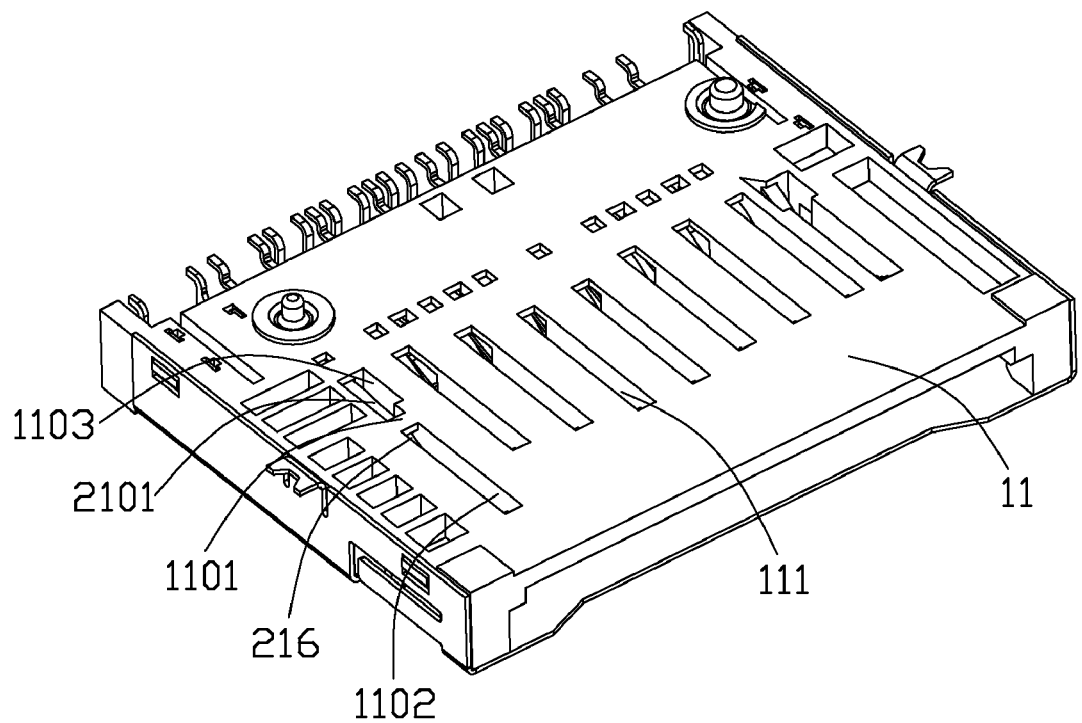
FIG. 2 is another perspective view of the electrical card connector shown in FIG. 1.

Referring to FIGS. 2-4, the insulative housing 1 being molded of dielectric material such as plastic or the like, has a bottom wall 11, a pair of right and left side walls 12, 13 extending upwardly from two lateral side of the bottom wall 11, and a rear wall 14 extending upwardly from a rear end of the bottom wall 11 and connecting the left and right side walls 12, 13. A receiving space 15 is formed among the bottom wall 11, the right and left side walls 12, 13, and the rear wall 14 for receiving the first card and the second card respectively. The bottom wall 11 has a set of slots 111 passing therethrough along a height direction of the electrical card connector 100 and extending along the first card insertion direction. At least one of the slots 111 has a pair of ribs 114 located at two lateral sides thereof and extending upwardly from the bottom wall 11. The slots 111 are arranged in one row along a transverse direction perpendicular to the first card insertion direction and include a special slot 110 arranged at an outmost side thereof The special slot 110 is longer than the other slots 111 along the first card insertion direction and has a front end closer to the interface 101 than that of the other slots 111. The bottom wall 11 has a protrusion 1101 extending into the special slot 110 and separating the special slot 110 into a front first slot 1102 and a rear second slot 1103. The bottom wall 11 has a set of stopping portions 1104, 1114 at each front end of the slots 111. The bottom wall 11 has a set of embossments 112 extending upwardly therefrom and located behind the slots 111. The embossments 112 are arranged alternatively in one row along the transverse direction. The left side wall 13 has a first groove 131 extending along the first card insertion direction and communicating with the receiving space 15. The right side wall 12 has a second and third groove 123, 124 extending along the first card insertion direction and communicating with the receiving space 15. The third groove 124 is located between the right side wall 12 and the second portion 122. The second groove 123 locates at an outside of the third groove 124. An arm portion extends from the right side wall 12 inwardly into the receiving space 15. The arm portion includes a first portion 121 extending integrally from the right side wall 12 and defining an inclined face 125 for abutting against a bevel of the first card, and a second portion 122 extending backwardly from the first portion 121 for abutting against the second card inwardly. The second portion 122 has a ladder 1221 formed on a lower surface thereof for engaging with a step on the second card. The second portion 122 is located directly over the second slot 1103, therefore, the ladder 1221 on the lower surface is directly over the second slot 1103 so as to be processed by a machine tool (not shown) easily. The rear wall 14 has a plurality of cavities 141 passing therethrough and arranged in an upper row and a lower row along the transverse direction. The rear wall 14 defines a front face 142 facing the receiving space 15 for abutting against a front end of the second card.

Figure 5:
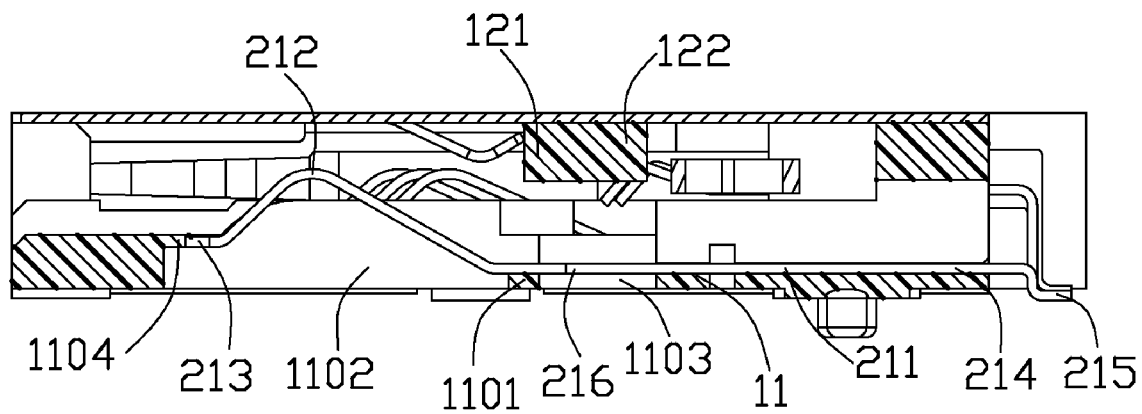
FIG. 5 is a cross-sectional view of the electrical card connector taken along line 5-5 of FIG. 1.

Referring to FIGS. 3 to 5, the contacts 2 comprise a plurality of first contacts 21 for mating with the first card and a plurality of second contacts 22 for mating with the second card. Each first contact 21 has a first retaining portion 214 retained in the respective cavity 141 arranged in the lower row on the rear wall 14, a first tail portion 215 extending downwardly from the first retaining portion 214 and bending backwardly for being soldered directly onto a surface of a printed circuit board (PCB, not shown), a first main portion 211 extending forwardly from the first retaining portion 214 and sustained by the bottom wall 11, a first contacting portion 212 movably received in the respective slot 111 and bending upwardly into the receiving space 15 for mating with the first card, and a first resisting portion 213 extending forwardly from the first contacting portion 212 and resisted downwardly by the respective stopping portion 1104, 1114 to prevent the contacting portion 212 from upwardly over-deformation. The first main portion 211 is constrained between two adjacent embossments 112 to be firmed on the bottom wall 11 more effectively.

The first contacts 21 include a special contact 210 located at an outmost side thereof The special contact 210 further comprise a connecting portion 216 connecting a rear end of the first contacting portion 212 and a front end of the first main portion 211. Therefore, the special contact 210 is longer than the other first contacts 21 along the first card insertion direction, and the first contacting portion 212 of the special contact 210 is closer to the interface 101 than the other contacting portions 212 and is movably received in the first slot 1102. The first main portion 211 is constrained between an embossment 112 and the right side wall 12, therefore, the right side wall 12 can be present as an embossment. The connecting portion 216 extends forwardly from the front end of the main portion 211 along the second slot 1103 of the special slot 110 and has a front end connecting to the first contacting portion 212 and sustained upwardly by the protrusion 1101. Therefore, the first contacting portion 212 of the special contact 210 which extends from the front end of the connecting portion 216 will have strong elastic force to contact with the first card.

Each second contact 22 has a second retaining portion 224 retained in the cavity 141 arranged in the upper row on the rear wall 14, a second tail portion 225 extending downwardly from the second retaining portion 224 and bending backwardly for being soldered directly onto the surface of the PCB, a second main portion 221 extending forwardly from the second retaining portion 224, and a second contacting portion 222 extending from the second main portion 221 and bending upwardly for mating with the second card. The second contacting portions 222 are located further from the interface 101 than the first contacting portions 212. The second tail portions 225 and the first tail portions 215 are arranged in one row along the transverse direction.

Referring to FIGS. 3 and 4, the detecting terminals 3 include a first detecting terminal 31 received on the first groove 131, a second detecting terminal 32 received on the second groove 123 and a third detecting terminal 33 received on the third groove 124. Each of the first, second and third detecting terminal 31, 32, 33 has a main body 301, a detecting portion 302 extending forwardly from the main body 30 and bending inwardly into the receiving space 15 for contacting with the first or second card, an end portion 303 extending from a front end of the detecting portion 302 for contacting with the respective first, second or third spring tab 412, 422, 432 and resisted by the left side wall 13, the right side wall 14 or the second portion 122 respectively to prevent inwardly over-deformation of the detecting portion 302, and a secured portion 304 extending downwardly from the main body 301 for being retained in the insulative housing 1.

The metal shell 4 has a top plate 41 covering the receiving space 15, and a pair of left and right plates 42, 43 extending downwardly from two lateral sides of the top plate 41. The top plate 41 has a pair of fingers 411 extending downwardly into the receiving space 15 for retaining the first and the second card respectively, and a third spring tab 412 extending downwardly into the third groove 124. a first and second spring tab 422, 432 are integrally formed with the left and right plate 42, 43 respectively. The first, second, and third spring tab 412, 422, 432 extend along the card insertion direction and parallel to each other. The detecting portions 302 of the first and the second detecting terminals 31, 32 are brought into or out of contacting with the first and second spring tabs 422, 432 respectively with insertion or ejection of the first card so as to detect the insertion of the first card. The detecting portion 302 of the third detecting terminal 33 is brought into or out of contacting with the third spring tab 412 with insertion or ejection of the second card so as to detect the insertion of the second card.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An electrical card connector comprising:
an insulative housing having a receiving space for receiving a first card and a second card, and a bottom wall under the receiving space, the bottom wall having a plurality of slots extending along the first card insertion direction, the slots including a special slot having a protrusion extending thereinto;
a metal shell covering the insulative housing;
a plurality of first contacts having first retaining portions retained in the insulative housing, first contacting portions received in the slots and bending upwardly into the receiving space for mating with the first card, and first tail portions extending from the first retaining portions for being mounted to a PCB, the first contacts including a special contact having a connecting portion extending along the special slot and located between the first contacting portion and the first retaining portion; and
a plurality of second contacts extending into the receiving space for mating with the second card; wherein
the connecting portion is sustained upwardly by the protrusion;
the insulative housing has a pair of left and right side walls extending upwardly from two lateral sides of the bottom wall and an arm portion extending from the right side wall inwardly into the receiving space, the arm portion includes a first portion extending integrally from the right side wall and defining an inclined face for abutting against a bevel of the first card, and a second portion extending along the second card insertion direction from the first portion for abutting against the second card inwardly.

2. The electrical card connector according to claim 1, wherein the special contact has a length longer than that of the other first contacts along the first card insertion direction.

3. The electrical card connector according to claim 1, wherein each of the first contacts has a first main portion sustained by the bottom wall, in the special contact, the first main portion connects the connecting portion and the retaining portion, in the other first contacts, the first main portion connects the contacting portion and the retaining portion.

4. The electrical card connector according to claim 3, wherein the bottom wall has a plurality of embossments extending upwardly therefrom, the first main portion is constrained between two adjacent embossments.

5. The electrical card connector according to claim 1, wherein the special slot is longer than the other slots along the first card insertion direction and is separated into a first slot for receiving the first contacting portion of the special contact and a second slot for receiving the connecting portion by the protrusion, the protrusion sustains an end of the connecting portion which connecting to the first contacting portion.

6. The electrical card connector according to claim 5, wherein the second portion has a ladder formed on a lower surface thereof for engaging with a step on the second card and located directly over the second slot.

7. The electrical card connector according to claim 1, wherein the cover has a top plate defining a third spring tab extending therefrom, a left plate extending downwardly from a left side of the top plate and defining a first spring tab extending therefrom, and a right plate extending downwardly from a right side of the top plate and defining a second spring tab extending therefrom, the first, second, and third spring tab extend along the first card insertion direction and parallel to each other, the electrical card connector further comprises a first and second detecting terminals retained in the left and right side walls for being brought into or out of contacting with the first and second spring tabs respectively with insertion or ejection of the first card, and a third detecting terminal retained in the right side wall and located at an inside of the second detecting terminal for being brought into or out of contacting with the third spring tab with insertion or ejection of the second card.

8. The electrical card connector according to claim 7, wherein the right side wall has a third groove extending along the second card insertion direction and formed between the arm portion and the right side wall, the third detecting terminal and the third spring tab are received in the third groove, the third detecting terminal has a detecting portion for contacting with the second card and an end portion extending from the detecting portion for contacting with the third spring tab, the end portion is resisted by the second portion to prevent inwardly over-deformation of the detecting portion.

9. The electrical card connector according to claim 1, wherein each slot has a stopping plate at a front end thereof, each first contact has a first resisting portion extending forwardly from the first contacting portion and resisted downwardly by the respective stopping portion.

10. An electrical card connector comprising:
an insulative housing having a bottom wall, a rear wall extending upwardly from a rear end of the bottom wall and a receiving space formed therebetween for receiving a first card and a second card, the bottom wall having a plurality of slots extending along the first card insertion direction, the slots including a special slot having a protrusion extending thereinto;
a plurality of first contacts including a special contact having a length longer than that of the other first contacts along the first card insertion direction, the special contact having a first retaining portion retained in the rear wall, a first contacting portion received in the special slot and bending upwardly into the receiving space for mating with the first card, a first tail portion extending from the first retaining portions for being mounted to a PCB, and a connecting portion connecting the contacting portion and located between the first contacting portion and the first retaining portion, the connecting portion extending along the special slot and being sustained upwardly by the protrusion;
a plurality of second contacts extending into the receiving space for mating with a second card; and
a metal shell covering the insulative housing; wherein
the insulative housing has a side wall extending upwardly from the bottom wall and located at one side of the receiving space, and an arm portion extending inwardly into the receiving space from the side wall, the arm portion includes a first portion extending integrally from the side wall and defining an inclined face for abutting against a bevel of the first card, and a second portion extending along the second card insertion direction from the first portion for abutting against the second card inwardly.

11. The electrical card connector according to claim 10, wherein the special contact has a first main portion sustained by the bottom wall and connecting the connecting portion and the retaining portion.

12. The electrical card connector according to claim 11, wherein the bottom wall has a pair of embossments extending upwardly therefrom and located at two lateral side of the first main portion for retaining the first main portion.

13. The electrical card connector according to claim 10, wherein the special slot is longer than the other slots along the first card insertion direction and is separated into a first slot for receiving the first contacting portion and a second slot for receiving the connecting portion by the protrusion, the protrusion sustains a front end of the connecting portion which connecting to the first contacting portion.

14. The electrical card connector according to claim 13, wherein the second portion has a ladder formed on a lower surface thereof for engaging with a step on the second card and located directly over the second slot.

15. An electrical card connector comprising:
- an insulative housing defining a bottom wall and a card receiving space above said bottom wall;
- a plurality of slots formed in the bottom wall along a front-to-back direction;
- a plurality of contacts disposed in the corresponding slots with contacts sections extending upwardly into the card receiving space;
- a cover assembled to the housing and covering said card receiving space in a vertical direction perpendicular to said front-to-back direction;
- an arm portion unitarily formed on one transverse side of the housing and extending into the card receiving space in a transverse direction perpendicular to both said vertical direction and said front-to-back direction, an extension portion located at a transversely innermost end of said arm portion and formed with a bevel structure in a top view and a step structure in an elevation view;
- an outermost one of said slots being closer to said arm portion than others; and
- a pair of ribs upwardly unitarily extending from the bottom wall and intimately by two transverse sides of said outermost one of the slots to protect the corresponding contact therein; wherein
- the step structure of said extension portion of the arm portion and an inner one of said pair of ribs are essentially commonly located in a same vertical plane while being offset from each other in said front-to-back direction so as to facilitate forming of said step structure and said inner one of the pair of ribs during injection molding of said housing.

16. The electrical card connector as claimed in claim 15, wherein said bottom wall defines a space under said step structure for allowing forming of the step structure during said injection molding.

17. The electrical card connector as claimed in claim 16, wherein said extension portion further includes another step structure intimately located beside said step structure in the elevation view and essentially above the outermost one of the slots in said vertical direction under condition that said outermost one of the slots directly downwardly communicates with an exterior under said another step structure so as to allow forming of said another step structure during said injection molding.

18. The electrical card connector as claimed in claim 17, wherein said outermost one of the slots is equipped with a protrusion therein so as to isolate said slot from the exterior in the vertical direction thereabouts under condition that the corresponding contact disposed in said outermost one of the slots is seated upon said protrusion for reinforcing resiliency thereof at least when a corresponding card is inserted into the card receiving space.

* * * * *